United States Patent
Yeh (12)

(10) Patent No.: US 6,521,363 B1
(45) Date of Patent: Feb. 18, 2003

(54) ELASTIC SHEET STRUCTURE FOR THE CONTACT OF A BATTERY SET

(76) Inventor: Shih-Ping Yeh, 5F-5, No. 33, Ning-Po West Street, Taipei City (TW)

( * ) Notice: Subject to any disclaimer, the term of this patent is extended or adjusted under 35 U.S.C. 154(b) by 0 days.

(21) Appl. No.: 09/556,090

(22) Filed: Apr. 21, 2000

(51) Int. Cl.[7] .............................................. H01M 12/00
(52) U.S. Cl. ............................... 429/9; 429/7; 429/158; 429/121; 307/150
(58) Field of Search ................................. 429/9, 7, 158, 429/160, 121, 97, 99, 178, 123; 320/107, 112, 110; 307/150

(56) References Cited

U.S. PATENT DOCUMENTS

| | | | | |
|---|---|---|---|---|
| 5,015,546 A | * | 5/1991 | Dulaney et al. | 429/99 |
| 5,212,021 A | * | 5/1993 | Smith et al. | 429/9 |
| 5,264,303 A | * | 11/1993 | McCaffery | 429/99 |
| 5,384,207 A | * | 1/1995 | Ohtani | 429/9 |
| 5,545,491 A | * | 8/1996 | Farley | 429/7 |
| 5,977,746 A | * | 11/1999 | Hershberger et al. | 320/112 |
| 6,238,818 B1 | * | 5/2001 | Dalton | 429/96 |

* cited by examiner

*Primary Examiner*—Stephen Kalafut
*Assistant Examiner*—R Alejandro
(74) *Attorney, Agent, or Firm*—Stetina Brunda Garred & Brucker

(57) ABSTRACT

An elastic sheet structure for the contact of a battery set used in a portable computer is provided. It comprises a positive-end elastic sheet and a negative-end elastic sheet having a central hole thereon. The size of the positive-end elastic sheet is smaller than that of the central hole of the negative-end elastic sheet. This invention may assemble several electric cells into a complete battery set for a portable computer. The special design avoids damaging the portable computer due to the misplacement of the positive end and the negative end of the electric cells of the battery set. It also provides a simple and convenient way to assemble the battery set.

2 Claims, 7 Drawing Sheets

ELASTIC SHEET STRUCTURE FOR THE CONTACT OF A BATTERY SET

FIELD OF THE INVENTION

The present invention relates generally to an elastic sheet structure for the contact of electric cells, and more specifically to an elastic sheet structure for the contact of a battery set used in a portable computer.

BACKGROUND OF THE INVENTION

Recently, along with the improvement of portable computers, the battery for the portable computers is changed too. Therefore, often times the user's portable computer is not broken down, but because the battery is already out of date, users are not able to successfully buy a new battery to provide the power of the portable computer. This causes the difficulty when using.

Conventional battery comprises a battery set A, a conductive sheet B, wires C and a box D, as shown in FIG. 1. The battery set A is composed of several pairs of electric cells. These electric cells are not commercial electric cells as usual. They must meet industrial standards with higher voltages. Therefore, there is potential risk to damage the portable computer if the electric cells are misplaced. In addition, due to complicated manufacturing process, it needs special technique to assemble battery to avoid the battery becoming inferior. Hence batteries in the market are assembled and packed with a fixed number of electric cells. The overall size and shape of a battery may also be changed when the design of a portable computer is changed. Therefore, different brand of portable computer uses different kind of battery. Once the battery stops production, the portable computer is unable to be used.

SUMMARY OF THE INVENTION

The primary object of the invention is to provide an elastic sheet structure for the contact of a battery set used in a portable computer to improve the aforementioned disadvantages. It comprises a positive-end elastic sheet and a negative-end elastic sheet having a central hole thereon. The size of the positive-end elastic sheet is smaller than that of the central hole of the negative-end elastic sheet. It effectively overcomes the difficulty caused by conventional battery. It also makes the use of batteries more safe and convenient.

According to the invention, the elastic sheet structure may connect as many electric cells as needed for any portable computer. Instead of buying a battery, consumers can just buy as many electric cells as needed without worrying whether or not the battery matches the portable computer. For example, using the elastic sheet structure of the present invention is just like the way used in spot light, audio/video equipment, walkman, and so on. Consumers may only buy the right kind of electric cells and assemble these electric cells by themselves into a complete battery set. Therefore, this invention provides a simple and convenient way to assemble a battery set.

Another object of the present invention is to avoid damaging a portable computer due to the misplacement of the positive end and the negative end of the electric cells. By the design of the elastic sheet structure of the invention, the circuit is open when electric cells are misplaced. Therefore, there is no current of high voltage flow into the portable computer. Hence this invention provides convenience and safety to the consumers.

The foregoing and other objects, features, aspects and advantages of the present invention will become better understood from a careful reading of a detailed description provided herein below with appropriate reference to the accompanying drawings.

BRIEF DESCRIPTION OF TH DRAWINGS

DETAILED DESCRIPTION OF TH PREFERRED EMBODIMENTS

Figure 1:
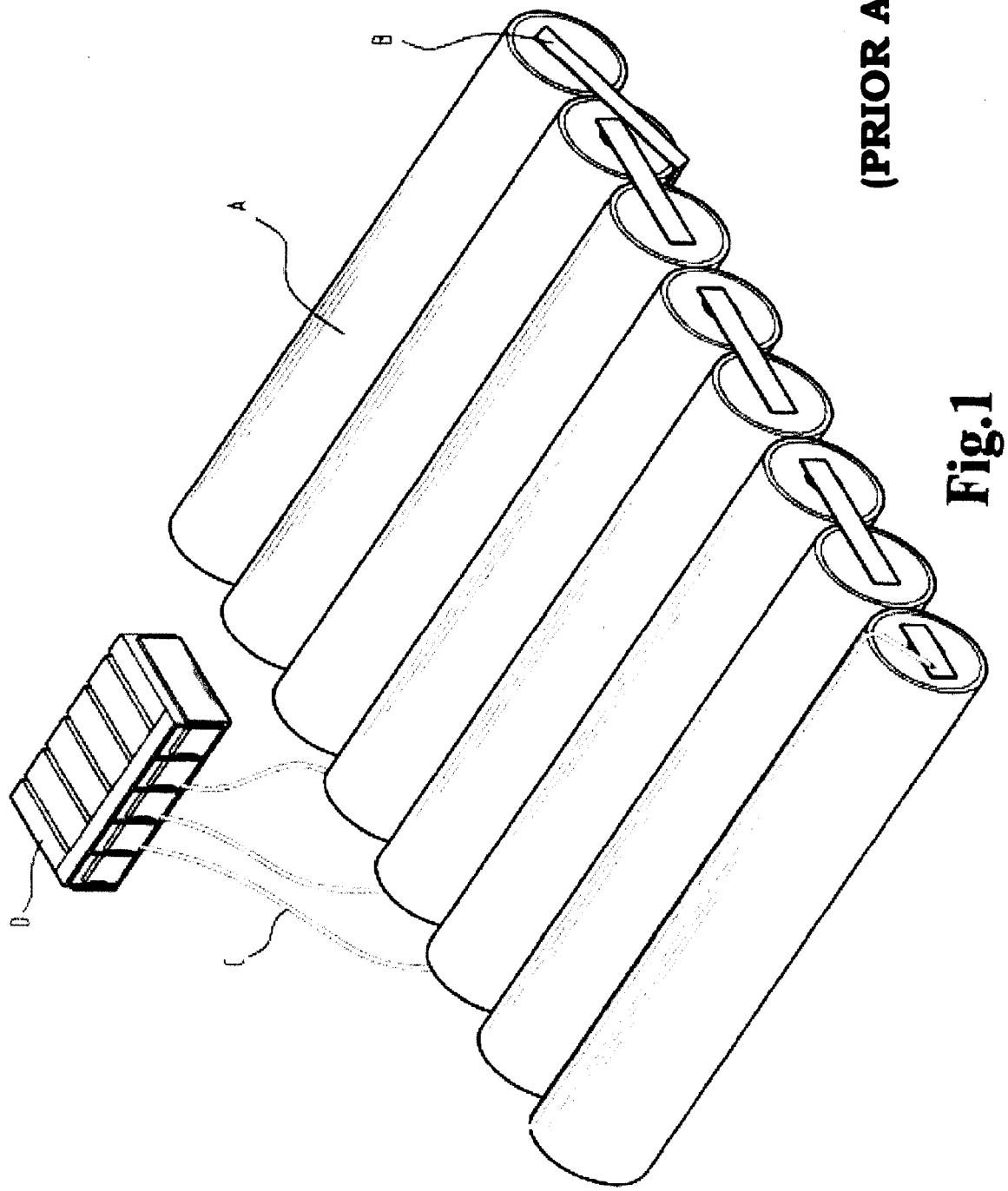
FIG. 1 is a top view of a conventional battery.
Figure 2:
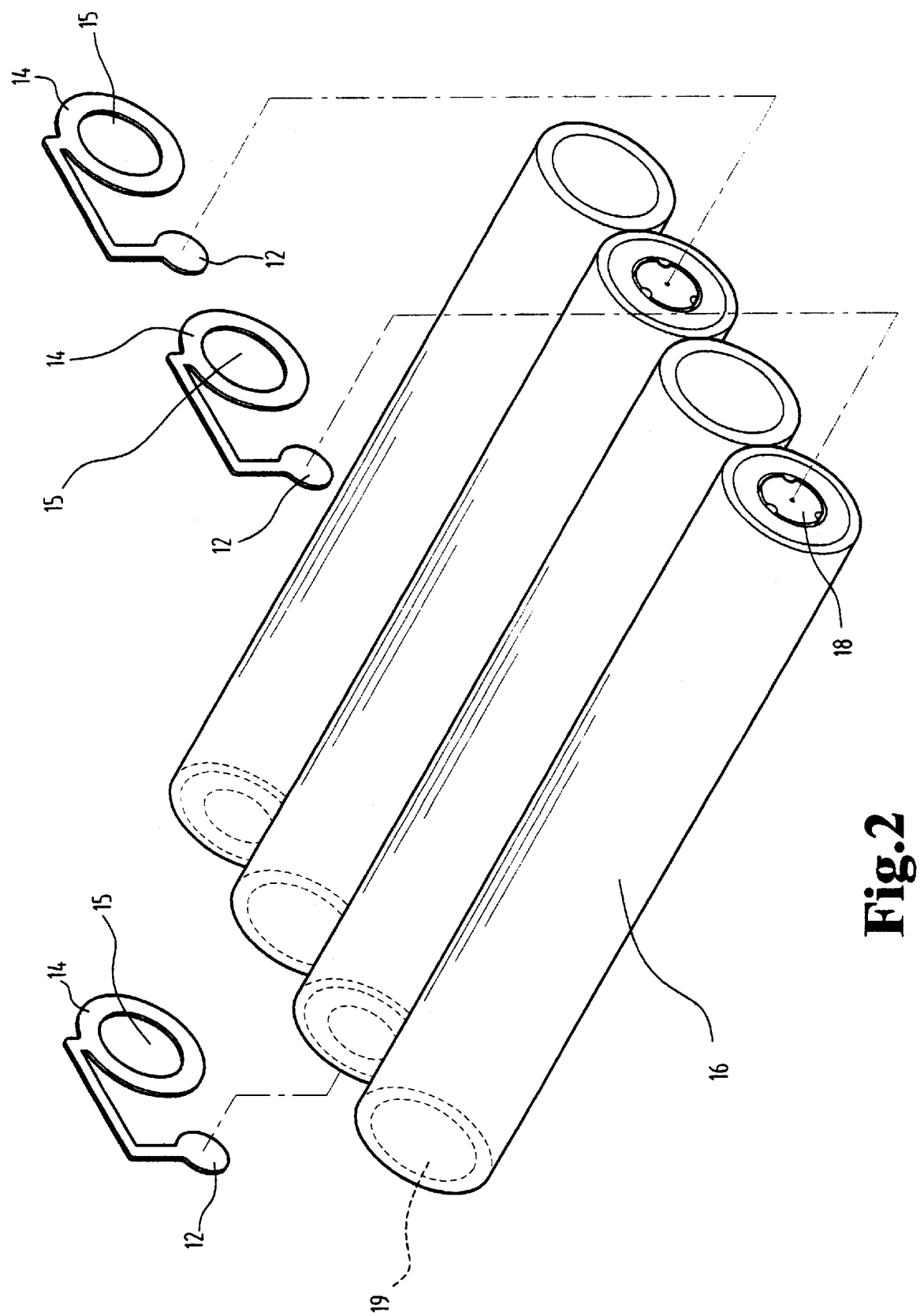
FIG. 2 is a perspective view in the first preferred embodiment of the present invention.
Figure 3:
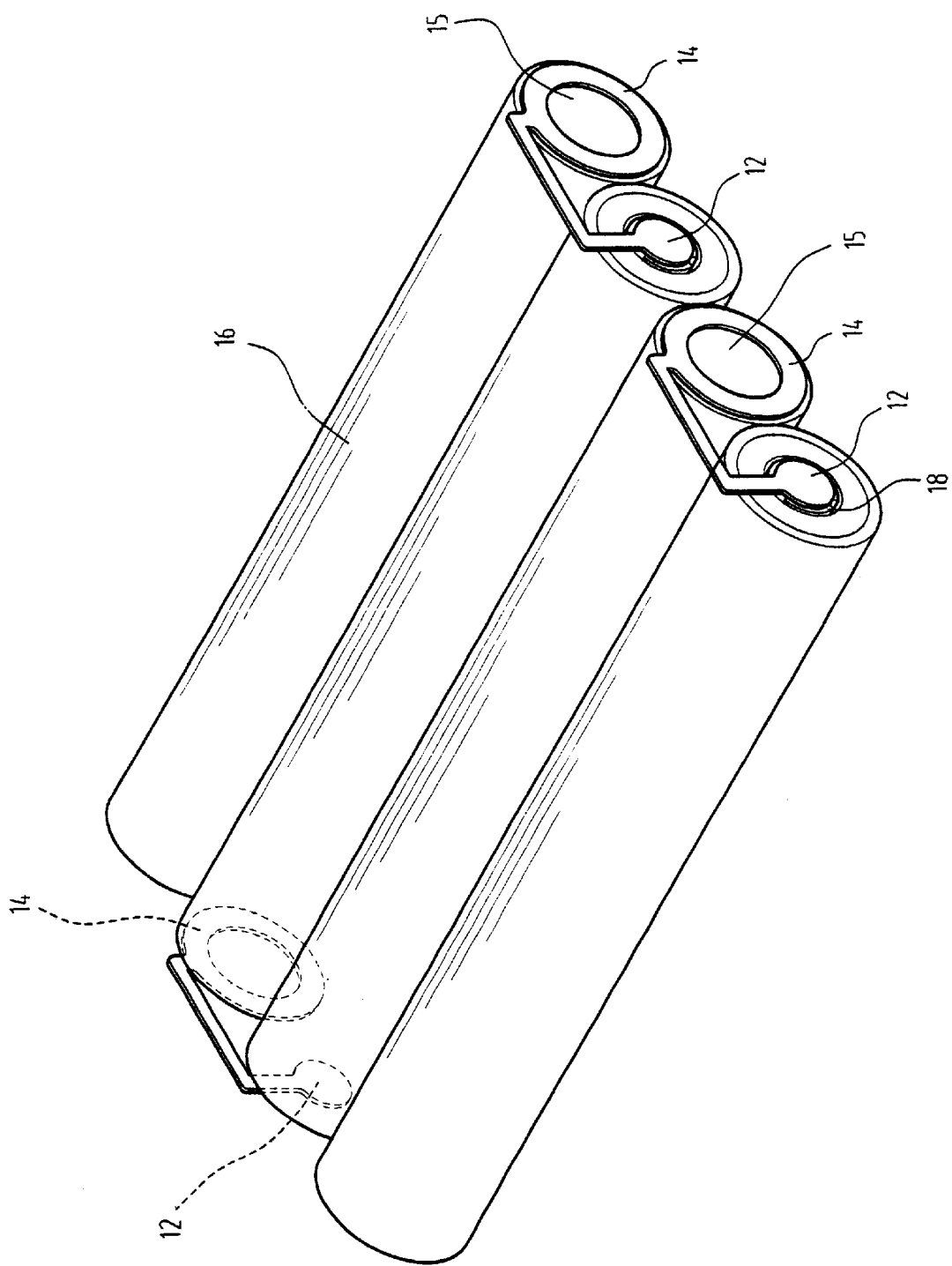
FIGS. 3–4 illustrate the assembly of the correct placement and the misplacement of the electric cells in the first preferred embodiment of the present invention respectively.
Figure 4:
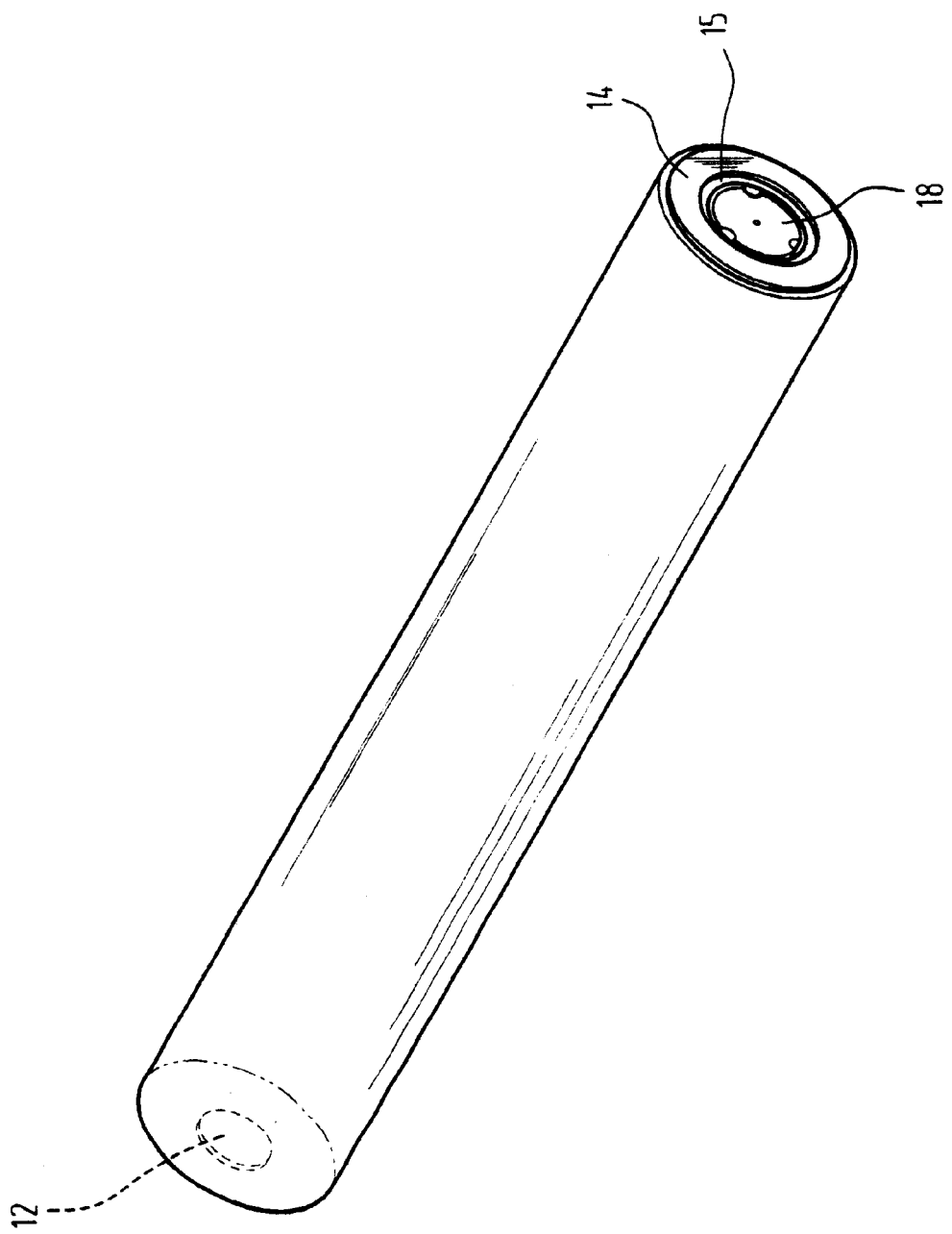

FIG. 2 is a perspective view in the first preferred embodiment of the present invention. As shown in FIG. 2, the elastic sheet structure for the contact of a battery set used in a portable computer comprises a positive-end elastic sheet 12 and a negative-end elastic sheet 14 having a central hole 15 thereon. The size of the positive-end elastic sheet 12 is smaller than that of the central hole 15 of the negative-end elastic sheet 14. FIG. 3 shows an assembly of the correct placement of electric cells for the battery set in the first preferred embodiment of the present invention. The positive-end elastic sheet 12 connects to the positive end 18 of the electric cell 16 while the negative-end elastic sheet 14 connects to the negative end 19 of the electric cell 16. This connection conducts a correct closed circuit to provide the power to the portable computer. FIG. 4 shows the assembly of the misplacement of the electric cells in the first preferred embodiment of the invention.

Because the size of the central hole 15 of the negative-end elastic sheet 14 is larger than that of the positive end 18 of the electric cell 16, the circuit is open if the electric cell 16 is misplaced. Therefore, there is no current of high voltage flow into the portable computer.

This avoids damaging the portable computer.

Figure 5:
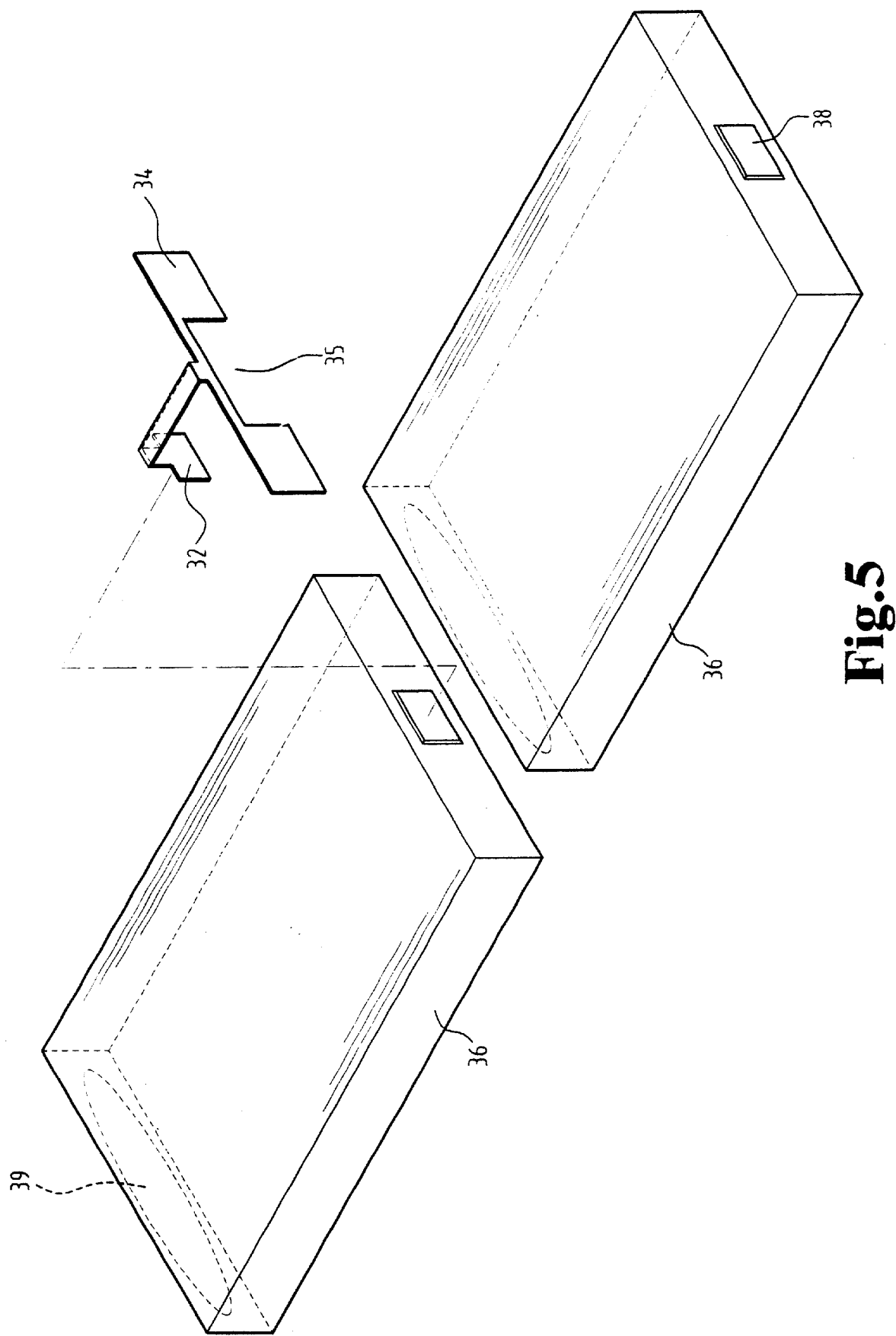
FIG. 5 is a perspective view in the second preferred embodiment of the present invention.
Figure 6:
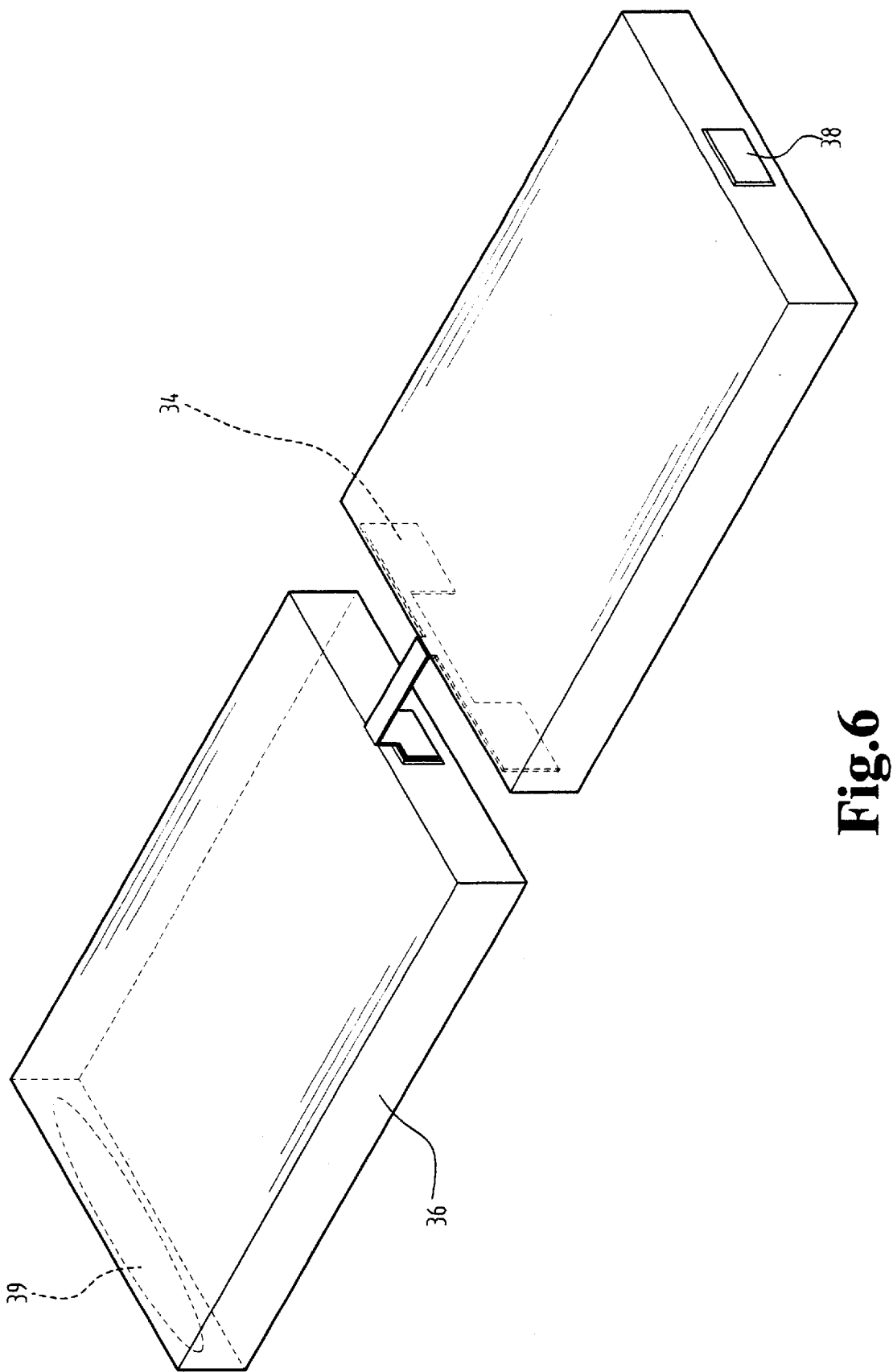
FIGS. 6–7 illustrate the assembly of the correct placement and the misplacement of the electric cells in the second preferred embodiment of the present invention respectively.
Figure 7:
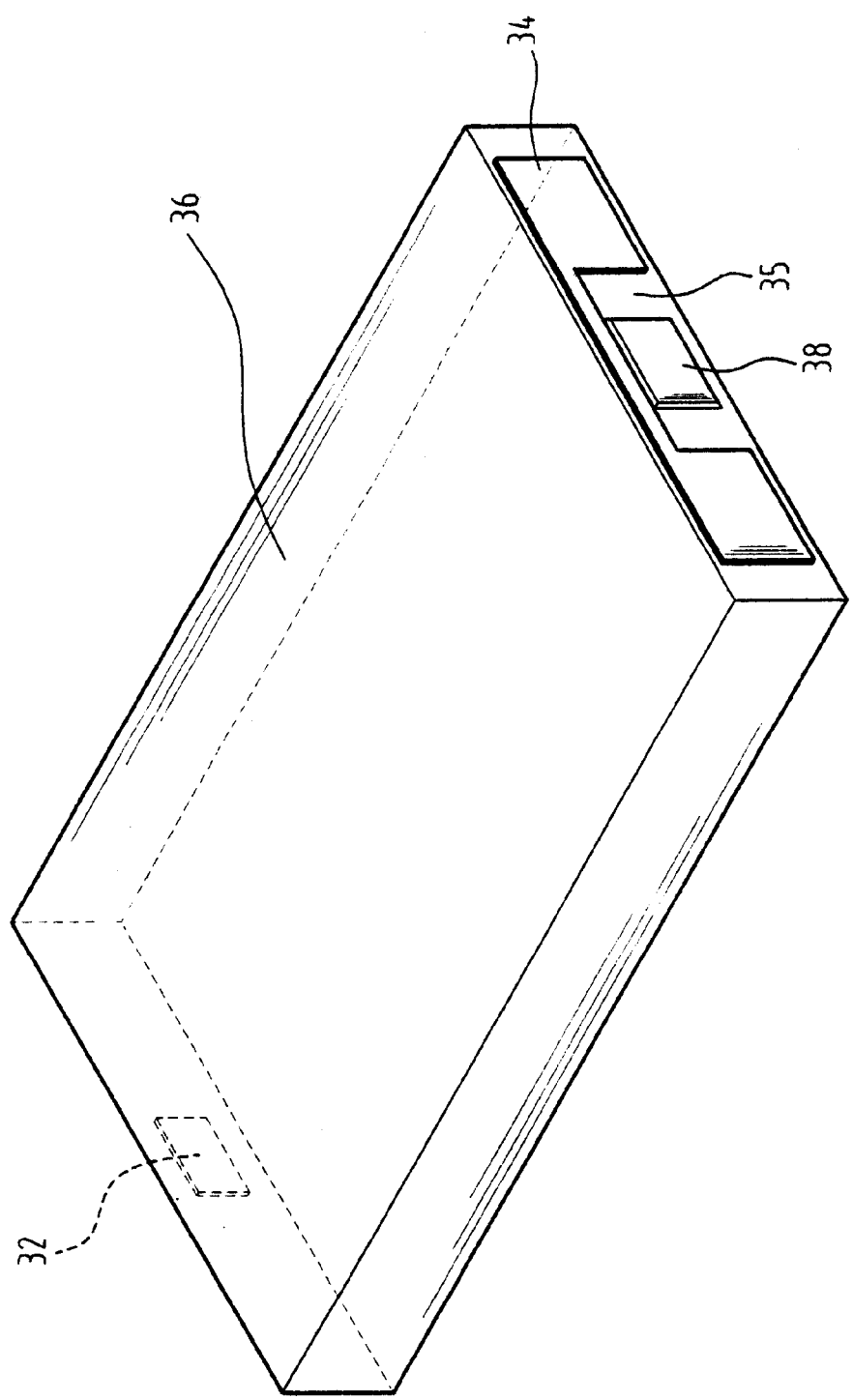

FIG. 5 is a perspective view in the second preferred embodiment of the present invention. As shown in FIG. 5, the elastic sheet structure for the contact of a battery set used in a portable computer comprises a positive-end elastic sheet 32 and a negative-end elastic sheet 34 having a central hole 35 thereon. The size of the positive-end elastic sheet 32 is smaller than that of the central hole 35 of the negative-end elastic sheet 34. FIG. 6 shows an assembly of the correct placement of the electric cells in the second preferred embodiment of the present invention. The positive-end elastic sheet 32 connects to the positive end 38 of the electric cell 36 while the negative-end elastic sheet 34 connects to the negative end 39 of the electric cell 36. This connection conducts a correct closed circuit to provide the power to the portable computer. FIG. 7 shows an assembly of the misplacement of the electric cells in the second preferred embodiment of the present invention. Because the size of the central hole 35 of the negative-end elastic sheet 34 is larger than that of the positive end 38 of the electric cell 36, the circuit is open if the electric cell 36 is misplaced. Therefore, there is no current of high voltage flow into the portable computer. This avoids damaging the portable computer.

The elastic sheet structure of the present invention may connect as many electric cells as needed for any portable computer. Instead of buying a battery, consumers may just buy as many electric cells as needed without worrying whether or not the battery matches the portable computer. Consumers may only buy the right kind of electric cells and assemble these electric cells into a complete battery set. Therefore, this invention provides a simple and convenient way to assemble a battery set.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A elastic-sheet structure for the contact of a battery set used in a portable computer comprising:

a positive-end elastic sheet; and a negative-end elastic sheet having a central hole thereon, the size of said positive-end elastic sheet being smaller than that of said central hole of said negative-end elastic sheet;

wherein said battery set has a plurality of electric cells therein, each electric cell having a positive end and a negative end.

2. The elastic sheet structure for the contact of a battery set used in a portable computer as claimed in claim 1, wherein said positive-end elastic sheet connects to the positive end of one of said electric cells in said battery set while said negative-end elastic sheet connects to the negative-end of another one of said electric cells in said battery set.

* * * * *